United States Patent Office 3,336,320
Patented Aug. 15, 1967

3,336,320
SUBSTITUTED 11-NITROSO OR 11-AMINO-1,2,3,11,
12,12a - HEXAHYDRO(4H,6H) - PYRIDO[1,2-c][1,4]
BENZODIAZEPINES
Karl Johann Doebel, Ossining, and Abraham Wajngurt, Riverdale, N.Y., assignors to Geigy Chemical Corporation, Greenburgh, N.Y., a corporation of Delaware
No Drawing. Filed Sept. 20, 1965, Ser. No. 488,721
20 Claims. (Cl. 260—293)

This application is a continuation-in-part of our copending application Ser. No. 354,798, filed Mar. 25, 1964 now abandoned.

This invention relates to new and useful pyridobenzodiazepines and particularly to $N_{11}$-substituted pyridobenzodiazepine derivatives as well as the pharmaceutically acceptable acid addition salts thereof, which possess valuable pharmacological properties and are useful as pharmaceutical agents. The present invention pertains further to methods for producing such derivatives.

More particularly the instant invention concerns 11-nitroso- or 11-amino-1,2,3,11,12,12a-hexahydro(4H,6H)-pyrido[1,2-c][1,4]benzodiazepines which can be represented by the following structural formula

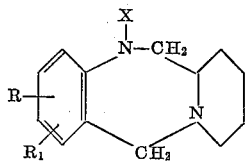

I wherein R and $R_1$ each stand for hydrogen, halogen (particularly chlorine, bromine and iodine), trifluoromethyl, lower alkyl, lower alkoxy or methylenedioxy, and X is nitroso or amino.

The term "lower alkyl" as used herein per se and as included in the term "lower alkoxy" means saturated monovalent aliphatic radicals of the general formula —$C_mH_{2m+1}$ wherein $m$ designates an integer of less than six and is inclusive of both straight-chain and branched-chain radicals, such as, methyl, ethyl, n-propyl, isopropyl, butyl, isobutyl, n-amyl, etc.

The present invention comprehends not only the above described pyridobenzodiazepine derivatives in their free base form, but it also includes pharmaceutically acceptable nontoxic acid addition salts thereof which may be formed from said derivatives in accordance with conventional practice, by using appropriate inorganic and organic acids, such as hydrohalic acids, especially hydrochloric and hydrobromic acids, sulfuric and phosphoric acids as well as acetic, lactic, succinic, malic, aconitic, phthalic and tartaric acids.

As mentioned above, the subject compounds possess valuable pharmacological properties; they can be characterized as hypotensive and anti-hypertensive, diuretic, anti-inflammatory and analgesic agents on the basis of pharmacological tests with animals.

Merely by way of illustration, 8-methyl-11-nitroso-1,2,3,11,12,12a - hexahydro(4H,6H)pyrido[1,2 - c][1,4] benzodiazepine has demonstrated a marked and prolonged antihypertension of doses of 3–10 mg./kg. p.o. in the Goldblatt dog. No other gross systemic effects were seen at the reported dose levels (0.5 and 1 mg./kg. p.o.).

Compounds of Formula I wherein X is nitroso are produced from 1,2,3,12,12a-hexahydro(4H,6H)pyrido[1,2-c][1,4]benzodiazepines of the formula

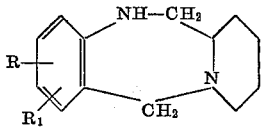

II wherein R and $R_1$ are as defined hereinabove, by reacting the latter with alkali metal nitrites, such, as sodium, potassium or lithium nitrites, in acidic media, as for example, in dilute mineral acids, e.g. hydrohalic—preferably hydrochloric—sulfuric, nitric, etc. acids or dilute lower alkanoic acids, e.g. formic, acetic or propionic acids. Alternatively, to obtain the desired nitroso compounds, compounds of Formula II can be reached with lower alkyl nitrites, such as, butyl nitrite, isoamyl nitrite, etc., in acidic media, as for instance, in glacial acetic acid.

Compounds of Formula I wherein X is amino are produced from 11-nitroso-1,2,3,11,12,12a-hexahydro(4H,6H) pyrido[1,2-c][1,4]benzodiazepines, i.e., compounds of Formula I wherein X is nitroso, by reduction of the latter with such reducing agents as zinc dust in an acid medium, e.g. in dilute acetic acid, tin in a medium of mineral acids, iron filings in a medium of dilute mineral acids, etc.

The starting materials of Formula II can be prepared by reduction with lithium aluminum hydride of (1) 1,2,3,11,12,12a - hexahydro(4H,6H)pyrido[1,2 - c][1,4] benzodiazepine-12-ones of the formula

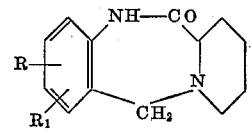

III wherein R and $R_1$ have the above-mentioned significance, which in turn are produced by reacting lower alkylpipecolinates and o-nitrobenzylhalides, reducing the o-nitrobenzylpipecolinates obtained to the corresponding o-aminobenzylpipecolinates and simultaneously saponifying and condensing the latter to yield compounds of the above Formula III, or (2) 1,2,3,11,12,12a-hexahydro(4H,6H) pyrido[1,2-c][1,4]benzodiazepine - 6,12 - diones of the formula

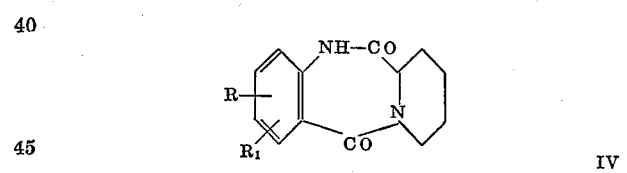

IV wherein R and $R_1$ are as defined above, which in turn are produced by reacting lower alkylpipecolinates and o-nitrobenzoyl halides, reducing the o-nitrobenzoylpipecolinates obtained to the corresponding o-aminobenzoyl-pipecolinates and saponifying and condensing the o-amino-benzoylpipecolinic carboxylic acids to give compounds of the above Formula IV.

The compounds of this invention and their acid addition salts as well as the various intermediates therefor, together with the over-all synthesis as well as the preparative steps, are more fully illustrated in experimental detail by the following examples. The scope of the invention is, however, not limited thereto. The temperatures therein given are in degrees centigrade.

In these examples, the following nomenclature is used:

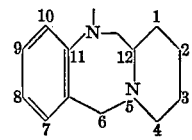

11-substituted-1,2,3,11,12,12a - hexahydro(4H,6H)pyrido [1,2-c][1,4]benzodiazepine.

EXAMPLE 1

*8-chloro-11-nitroso-1,2,3,11,12,12a-hexahydro (4H,6H)pyrido[1,2-c][1,4]benzodiazepine*

(a) ETHYL N-(2-NITRO-5-CHLOROBENZYL) PIPECOLINATE 33.3 g. of ethyl pipecolinate was dissolved in 200 ml. of dry toluene, 34 g. of potassium carbonate was added and a solution of 44.54 g. of 2-nitro-5-chlorobenzylchloride [synthesized via the procedure described by Eichengrum and Einhorn, A, 262, 133 (1891) and Fieser and Berliner, JACS 74, 536 (1952)] in 300 ml. of dry toluene dropped in while stirring. After the addition was complete the mixture was refluxed for 12 hours. After cooling the mixture was acidified and exhaustively extracted with 3 N hydrochloric acid. The combined acid extracts were washed with ethyl acetate and then made strongly alkaline. The precipitated oil was extracted with ether, the latter washed with water, dried over sodium sulfate and removed in vacuo. The residue was distilled in vacuo to yield 45.8 g. (66% theory) of desired intermediate as a yellow viscous oil; B.P. 153–154°/0.1 mm.

*Analysis.*—Calc'd for $C_{15}H_{19}ClN_2O_4$ (MW 326.79): C, 55.20%; H, 5.86%; Cl, 10.84%; N, 8.58%. Found: C, 55.20%; H, 6.00%; Cl, 11.03%; N, 8.59%.

(b) ETHYL N-(2-AMINO-5-CHLOROBENZYL) PIPECOLINATE 7.5 g. of ethyl N-(2-nitro-5-chlorobenzyl)pipecolinate was dissolved in 100 ml. of ethanol and hydrogenated at room temperature and atmospheric pressure over Raney nickel. Uptake of hydrogen was 1670 ml. The catalyst was then removed by filtration and the filtrate evaporated to dryness in vacuo. The residual oil was distilled to yield 5.1 g. of the desired intermediate as oil; B.P. 154°/0.3 mm.

*Analysis.*—Calc'd for $C_{15}H_{21}ClN_2O_2$ (MW 296.80): C, 60.80%; H, 7.12%; Cl, 11.93%; N, 9.45%. Found: C, 60.53%; H, 7.27%; Cl, 11.89%; N, 9.62%.

(c) 8-CHLORO-1,2,3,11,12,12a-HEXAHYDRO(4H,6H) PYRIDO-[1,2-c][1,4]BENZODIAZEPINE-12-ONE 20.0 g. of ethyl N-(2-amino-5-chlorobenzyl)pipecolinate was refluxed with 350 ml. of 3 N hydrochloric acid for 5 hours. After cooling, the solution was alkalized to pH 10 and then extracted exhaustively with chloroform. The combined chloroform extracts were washed with water, dried over sodium sulfate, and the solvent removed in vacuo. The residue weighed 16.32 g. and was a white crystalline solid. It could be recrystallized easily from ethanol. Yield of the desired compound was 14 g.; M.P. 224–225°.

*Analysis.*—Calc'd for $C_{13}H_{15}ClN_2O$ (MW 250.72): C, 62.35%; H, 6.03%; Cl, 14.13%; N, 11.17%. Found: C, 62.08%; H, 6.29%; Cl, 14.30%; N, 11.21%.

(d) 8-CHLORO-1,2,3,11,12,12a-HEXAHYDRO(4H,6H) PYRIDO-[1,2-c][1,4]BENZODIAZEPINE 0.7 g. of lithium aluminum hydride was suspended in 30 ml. of dry tetrahydrofuran. A solution of 2 g. of 8-chloro - 1,2,3,11,12,12a - hexahydro(4H,6H)pyrido[1,2-c][1,4]benzodiazepine-12-one in 100 ml. of tetrahydrofuran was added at room temperature while stirring. After addition was complete, the mixture was refluxed for 4 hours and excess lithium aluminum hydride destroyed by adding ethylacetate. The solvents were then removed in vacuo and the residue treated with a liberal amount of 3 N sodium hydroxide. This mixture was extracted with chloroform and the latter washed with water, dried over sodium sulfate and the solvent removed in vacuo. The residue crystallized spontaneously and was recrystallized from cyclohexane. Yield: 1.8 g.; M.P. 125–126°.

*Analysis.*—Calc'd for $C_{13}H_{17}ClN_2$ (MW 236.75): C, 66.40%; H, 7.24%; Cl, 14.96%; N, 11.82%. Found: C, 66.09%; H, 7.27%; Cl, 14.73%; N, 11.52%.

(e) 8-CHLORO-11-NITROSO-1,2,3,11,12,12a-HEXAHYDRO-(4H,6H)PYRIDO[1,2-c][1,4]BENZODIAZEPINE 14.5 g. of 8-chloro-1,2,3,11,12,12a-hexahydro(4H,6H)-pyrido[1,2-c][1,4]benzodiazepine was dissolved in a mixture of 44.8 ml. of concentrated hydrochloric acid and 106 ml. of water. The mixture was cooled to 15° while stirring. A solution of 8.4 g. of sodium nitrite in 30 ml. of water was added during a period of 10 minutes. The reaction mixture was stirred at the same temperature for an additional 2 hours and alkalized with 2 N sodium carbonate. The reaction mixture was extracted with chloroform, dried over sodium sulfate, filtered, and concentrated in vacuo. The residue crystallized upon cooling. After recrystallization from hexane, the material melted at 104–105°. Yield: 10 g.

*Analysis.*—Calc'd for $C_{13}H_{16}ClN_3O$ (MW 265.74): C, 58.75%; H, 6.09%; H, 15.81%; Cl, 13.34%. Found: C, 58.45%; H, 6.40%; H, 15.55%; Cl, 13.48%.

EXAMPLE 2

*8-chloro-11-nitroso-1,2,3,11,12,12a-hexahydro(4H,6H) pyrido-[1,2-c][1,4]benzodiazepine Hydrochloride*

50 mg. of 8-chloro-11-nitroso-1,2,3,11,12,12a-hexahydro - (4H,6H)pyrido[1,2-c][1,4]benzodiazepine was dissolved in 2 ml. of ethanol and one equivalent of 0.1 N HCl added. The mixture was concentrated in vacuo. The residue was covered with 2 ml. of ether and upon cooling and scratching crystallization occurred. Recrystallization from the mixture of alcohol and ether 1:1 afforded the desired compound, M.P. 137–139°.

EXAMPLE 3

*9-chloro-11-nitroso-1,2,3,11,12,12a-hexahydro(4H,6H)-pyrido[1,2-c][1,4]benzodiazepine*

4.7 g. of 9-chloro-1,2,3,11,12,12a-hexahydro(4H,6H)-pyrido[1,2-c][1,4]benzodiazepine, made according to the procedure described in Example 1, and having a M.P. of 131–132° after recrystallization from hexane, was dissolved in a mixture of 11.6 ml. of concentrated hydrochloric acid and 32 ml. of water. The mixture was cooled to 10° while stirring. A solution of 2.8 g. of sodium nitrite in 10 ml. of water was added during a period of 5 minutes. The reaction mixture was stirred at the same temperature for one additional hour and alkalized with 2 N sodium carbonate. The reaction mixture was extracted with chloroform, dried over sodium sulfate, filtered, and concentrated in vacuo. The residue was distilled to give 2.2 g. of a yellow oil; B.P. 190–192°/0.1 mm.

*Analysis.*—Calc'd for $C_{13}H_{16}ClN_3O$ (MW 265.74): C, 58.75%; H, 6.69%; N, 18.80%. Found: C, 58.75%; H, 6.41%; N, 18.71%.

EXAMPLE 4

*9-methoxy-11-nitroso-1,2,3,11,12,12α-hexahydro-(4H,6H)-pyrido[1,2-c][1,4]benzodiazepine*

2.35 g. of 9 - methoxy - 1,2,3,11,12,12a - hexahydro(4H,6H)-pyrido[1,2-c][1,4]benzodiazepine, made in accordance with the procedure described in Example 1 and having a M.P. of 104–105° after recrystallization from petroleum ether, was dissolved in a mixture of 2 ml. of concentrated hydrochloric acid and 4 ml. of water. The mixture was cooled to 10° while stirring. A solution of 0.7 g. of sodium nitrite in 2.5 ml. of water was added during a period of 3 minutes. The reaction mixture was stirred at the same temperature for an additional hour and alkalized with 2 N sodium carbonate. The reaction mixture was extracted with chloroform, dried over sodium sulfate, filtered and concentrated in vacuo. The residue was distilled to give 1.9 g. of yellow oil, B.P. 174–175°/0.05 mm.

EXAMPLE 5

*8,9-dimethoxy-11-nitroso-1,2,3,11,12,12a-hexahydro(4H,6H)pyrido[1,2-c][1,4]benzodiazepine*

(a) ETHYL N-(4,5-DIMETHOXY-2-NITROBENZOYL) PIPECOLINATE 4,5-dimethoxy-2-nitrobenzoic acid was prepared by oxidation of 4,5-dimethoxy - 2 - nitrobenzaldehyde. 11.3 g. (0.05 mole) of 4,5-dimethoxy-2-nitrobenzoic acid was dissolved in 250 ml. of benzene. To the resulting solution was added 0.1 mole of thionyl chloride. The mixture was refluxed for 6 hours and concentrated to a syrupy residue in vacuo. The residue was taken up in 100 ml. of benzene and again concentrated to a syrup. It was dissolved in 300 ml. of toluene and added to a mixture of 0.05 mole of triethylamine and 0.05 mole of ethylpipecolinate in 100 ml. of toluene at room temperature. The mixture was warmed for 6 hours at 80°. The reaction mixture was cooled and filtered. The toluene filtrate was washed with water and dried over sodium sulfate and the solvent removed in vacuo. The residual oil crystallized on cooling. After recrystallization from a mixture of hexane and benzene 1:1, the material melted at 120°. Yield: 4.5 g.

*Analysis.*—Calc'd for $C_{17}H_{22}N_2O_7$ (MW 366.37): C, 55.73%; H, 6.05%; N, 7.65%. Found: C, 55.85%; H, 5.96%; N, 7.58%.

(b) 8,9-DIMETHOXY-1,2,3,11,12,12a-HEXAHYDRO(4H,6H) PYRIDO[1,2-c][1,4]-BENZODIAZEPINE-6,12-DIONE 4. g. of ethyl N-(4,5-dimethoxy-2-nitrobenzoyl)-pipecolinate was dissolved in 250 ml. of alcohol and hydrogenated at room temperature at atmospheric pressure over Raney nickel. After the hydrogen uptake had stopped the catalyst was removed by filtration and the filtrate concentrated in vacuo. The residue of ethyl N-(4,5-dimethoxy-2-aminobenzoyl)pipecolinate was suspended in a mixture of 40 ml. 3 N sodium hydroxide and 25 ml. of alcohol. The mixture was warmed on the steam bath for 5 minutes. The alcohol was removed in vacuo and to the residue was added 150 ml. of 3 N hydrochloric acid. The mixture was allowed to stand for 48 hours. The solution was alkalized with sodium carbonate solution, extracted with chloroform, and dried over sodium sulfate. The solvent was removed in vacuo. The residue crystallized. After recrystallization from ethanol, the material melted at 255–256°. Yield: 1.2 g.

*Analysis.*—Calc'd for $C_{15}H_{18}N_2O_4$ (MW 290.29): C, 62.00%; H, 6.20%; N, 9.65%. Found: C, 61.87%; H, 5.95%; N, 9.62%.

(c) 8,9-DIMETHOXY-1,2,3,11,12,12a-HEXAHYDRO(4H,6H) PYRIDO[1,2-c][1,4]BENZODIAZEPINE 7 g. of 8,9-dimethoxy-1,2,3,11,12,12a-hexahydro(4H,6H)pyrido[1,2-c][1,4]benzodiazepine - 6,12 - dione was dissolved in 500 ml. of tetrahydrofuran. To this solution was added portionwise 3 g. of lithium aluminum hydride. The mixture was stirred and refluxed for 8 hours and then concentrated in vacuo. The residue was cooled and hydrolysed with 3 N sodium hydroxide. The solution was extracted with chloroform, the extract dried over sodium sulfate, and filtered. After concentration in vacuo the residue crystallized. Recrystallization from petroleum ether afforded a substance having a M.P. 116–117°. Yield: 2.5 g.

*Analysis.*—Calculated for $C_{15}H_{22}N_2O_2$ (MW 262.35): C, 68.67%; H, 8.45%; N, 10.68%. Found: C, 68.37%; H, 8.49%; N, 10.71%.

(d) 8,9-DIMETHOXY-11-NITROSO-1,2,3,11,12,12a-HEXAHYDRO(4H,6H)PYRIDO[1,2-c][1,4]BENZODIAZEPINE 2.62 g. of 8,9-dimethoxy-1,2,3,11,12,12a-hexahydro(4H,6H)pyrido[1,2-c][1,4]benzodiazepine was dissolved in a mixture of 2 ml. concentrated hydrochloric acid and 4 ml. of water. The mixture was cooled to 10° while stirring. A solution of 0.7 g. of sodium nitrite in 2.5 ml. of water was added during a period of 5 minutes. The reaction mixture was stirred at the same temperature for an additional one hour and alkalized with 2N sodium carbonate. The reaction mixture was extracted with chloroform, dried over sodium sulfate, filtered, and concentrated in vacuo. The residue crystallized upon cooling. After recrystallization from isopropanol, the material melted at 96–97°. Yield: 1.6 g.

*Analysis.*—Calculated for $C_{14}H_{19}N_3O$ (MW 245.31): C, 68.54%; H, 7.80%; N, 17.12%. Found: C, 68.38%; H, 7.85%; N, 17.27%.

EXAMPLE 5A

*8,9 - dimethoxy - 11 - nitroso-1,2,3,11,12,12a-hexahydro-(4H,6H)pyrido[1,2-c][1,4]benzodiazepine hydrochloride*

100 mg. of 8,9-dimethoxy - 11 - nitroso-1,2,3,11,12,12a-hexahydro - (4H,6H)pyrido[1,2-c][1,4]benzodiazepine was dissolved in 5 ml. of alcohol. To this solution was added one equivalent of 0.1 N hydrochloric acid. The mixture was concentrated in vacuo. The residue was covered with petroleum-ether and crystallization induced by cooling and scratching. Recrystallization from ethanol afforded the desired compound having M.P. 193–194°.

EXAMPLE 6

*8,9-dimethyl-11-nitroso-1,2,3,11,12,12a-hexahydro (4H,6H)pyrido[1,2-c][1,4]benzodiazepine*

3.5 g. of 8,9 - dimethyl - 1,2,3,11,12,12a-hexahydro (4H,6H)pyrido[1,2 - c][1,4]benzodiazepine, prepared in accordance with the procedure of the preceding Example 5, was dissolved in a mixture of 3 ml. of concentrated hydrochloric acid and 6 ml. of water. The mixture was cooled to 10° while stirring. A solution of 1.1 g. of sodium nitrite in 3.8 ml. of water was added during a period of 5 minutes. The reaction mixture was stirred for an additional two hours. 20 ml. of water was added and the mixture extracted with chloroform, the extracts dried over sodium sulfate, filtered, and concentrated in vacuo. The residue was dissolved in a solution of sodium carbonate and extracted with chloroform, the chloroform extract was dried over sodium sulfate, filtered, and concentrated in vacuo. After cooling and addition of hexane the compound crystallized. Recrystallization from cyclohexane afforded a substance having M.P. 62–63°. Yield: 2 g.

*Analysis.*—Calculated for $C_{15}H_{21}N_3O$ (MW 259.35): C, 69.46%; H, 8.16%; N, 16.21%. Found: C, 69.29%; H, 7.96%; N, 16.06%.

EXAMPLE 7

*8-methyl-11-nitroso-1,2,3,11,12,12a-hexahydro (4H,6H)pyrido[1,2-c][1,4]benzodiazepine*

(a) ETHYL N-(5-METHYL-2-NITROBENZOYL) PIPECOLINATE 8.5 g. of 5-methyl-2-nitrobenzoic acid was dissolved in 300 ml. of benzene. To the resulting solution was added 9 g. of thionyl chloride in 50 ml. of benzene. The mixture was refluxed for 8 hours and concentrated to a syrupy residue in vacuo. The residue was taken up in 100 ml. of benzene and again concentrated to a syrup. It was dissolved in 200 ml. of dry toluene and 15.7 g. of ethyl pipecolinate in 100 ml. of toluene added at room temperature. The mixture was refluxed for 6 hours. The reaction mixture was cooled and filtered. The toluene filtrate was washed with water and dried over sodium sulfate and the solvent removed in vacuo. The residue was distilled to give 10 g. of a yellow oil; B.P. 190–191°/ 0.05 mm.

*Analysis.*—Calculated for $C_{16}H_{20}N_2O_5$ (MW 320.34): C, 59.97%; H, 6.27%; N, 8.64%. Found: C, 60.08%; H, 6.28%; N 8.80%.

(b) 8-METHYL-1,2,3,11,12,12a-HEXAHYDRO(4H,6H)PYR-IDO[1,2-c][1,4]BENZODIAZEPINE-6,12-DIONE 10 g. of ethyl N-(methyl-2-nitrobenzoyl)pipecolinate was dissolved in 175 ml. of alcohol and hydrogenated at room temperature at atmospheric pressure over Raney-nickel. After hydrogen uptake had stopped the catalyst was removed by filtration and the filtrate concentrated in vacuo. The residue was distilled to give 6 g. of a yellow oil, B.P. 215–217°/0.2 mm. (with slight decomposition). The oil was suspended in 100 ml. of 3 N hydrochloric acid and allowed to stand for 2 days. The solution was alkalized with sodium hydroxide solution, extracted with chloroform, dried over sodium sulfate and concentrated to dryness. Yield: 3 g. After recrystallization from isopropanol, the desired material melted at 242–243°.

Analysis.—Calculated for $C_{14}H_{16}N_2O_2$ (MW 244.29): C, 68.83%; H, 6.60%; N, 11.46%. Found: C, 68.80%; H, 6.71%; N, 11.42%.

(c) 8-METHYL-1,2,3,11,12,12a-HEXAHYDRO(4H,6H) PYRIDO[1,2-c][1,4]BENZODIAZEPINE 10 g. of 8-methyl - 1,2,3,11,12,12a-hexahydro(4H,6H) pyrido[1,2-c][1,4]benzodiazepine - 6,12-dione was dissolved in 1200 ml. of tetrahydrofuran. To this solution was added portionwise 5 g. of lithium aluminum hydride. The mixture was stirred and refluxed for 11 hours and concentrated in vacuo. The residue was cooled and hydrolyzed with 3 N sodium hydroxide. The solution was extracted with chloroform, washed with water, dried over sodium sulfate, and filtered. After concentration in vacuo the residue crystallized. Recrystallization from a mixture of pentane/hexane 1:1 afforded a substance having M.P. 119–120°. Yield 8.7 g.

Analysis.—Calculated for $C_{14}H_{20}N_2$ (MW 216.32): C, 77.73%; H, 9.32%; N, 12.95%. Found: C, 77.80%; H, 9.58%; N, 12.67%.

(d) 8-METHYL-11-NITROSO-1,2,3,11,12,12a-HEXAHYDRO-(4H,6H)PYRIDO[1,2-c][1,4]BENZODIAZEPINE 8.6 g. of 8 methyl - 1,2,3,11,12,12a-hexahydro(4H,6H) pyrido[1,2-c][1,4]benzodiazepine was dissolved in a mixture of 5.8 ml. of concentrated hydrochloric acid and 16 ml. of water. The mixture was cooled to 10° while stirring. A solution of 2.8 g. of sodium nitrite in 10 ml. of water was added during a period of 5 minutes. The reaction mixture was stirred at the same temperature for an additional one hour and alkalized with sodium carbonate solution. The reaction mixture was extracted with chloroform, the combined extracts dried over sodium sulfate, filtered and the solvent removed in vacuo. The residue was distilled to give 5.8 g. of a yellow oil, B.P. 172–174°/0.2 mm. The oil crystallized upon cooling and the material melted at 68–69°.

Analysis.—Calculated for $C_{14}H_{19}N_3O$ (MW 245.31): C, 68.54%; H, 7.80%; N, 17.12%. Found: C, 68.38%; H, 7.85%; N, 17.27%.

EXAMPLE 8

*8-methyl-11-nitroso-1,2,3,11,12,12a-hexahydro(4H,6H)-pyrido[1,2-c][1,4]benzodiazepine hydrochloride*

100 mg. of 8-methyl-11-nitroso-1,2,3,11,12,12a hexahydro(4H,6H)pyrido[1,2-c][1,4]benzodiazepine was dissolved in 5 ml. of ethanol. To this solution was added one equivalent of hydrochloric acid. The mixture was concentrated in vacuo. The residue was covered with 3 ml. of ether and crystallization induced by cooling and scratching. Recrystallization from a mixture of ethanol and ether 1:1 afforded the desired substance having M.P. 204–205°.

EXAMPLE 9

*8-methyl-11-nitroso-1,2,3,11,12,12a-hexahydro(4H,6H)-pyrido[1,2-c][1,4]benzodiazepine sulfate*

100 mg. of 8-methyl-11-nitroso-1,2,3,11,12,12a-hexahydro(4H,6H)pyrido[1,2-c][1,4]benzodiazepine was dissolved in 5 ml. of ethanol. To this solution was added one equivalent of 0.1 N sulfuric acid. The mixture was concentrated in vacuo. The residue was covered with 3 ml. of ether and crystallization induced by cooling and scratching. Recrystallization from isopropanol afforded the subject compound having M.P. 182–183°.

EXAMPLE 10

*8-methyl-11-amino-1,2,3,11,12,12a-hexahydro(4H,6H)-pyrido[1,2-c][1,4]benzodiazepine*

3.8 g. of Zn-dust was suspended in 15 ml. of water. 2.45 g. of 8-methyl-11-nitroso-1,2,3,11,12,12a-hexahydro(4H,6H)pyrido[1,2-c][1,4]benzodiazepine was dissolved in a mixture of 6 ml. of acetic acid and 6 ml. of water. The mixture was added dropwise at 10° to the suspension of Zn-dust in water. The reaction mixture was stirred at room temperature for an additional one hour and warmed on the steam bath for 5 minutes. The mixture was filtered and the Zn-dust washed with water. The filtrate was cooled and alkalized with 3 N sodium hydroxide, and extracted with chloroform. The choloroform solution was dried over sodium sulfate, filtered, and concentrated in vacuo. The residue crystallized upon cooling. After recrystallization from petroleum/ether, the material melted at 83–84°. Yield: 2.19 g.

Analysis.—Calculated for $C_{14}H_{21}N_3$ (MW 231.33): C, 72.68%; H, 9.15%; N, 18.17%. Found: C, 72.42%; H, 9.33%; N, 18.09%.

EXAMPLE 11

*8-methyl-11-amino-1,2,3,11,12,12a-hexahydro(4H,6H)-pyrido[1,2-c][1,4]benzodiazepine monohydrochloride*

100 mg. of 8-methyl-11-amino-1,2,3,11,12,12a-hexahydro(4H,6H)pyrido[1,2-c][1,4]benzodiazepine was dissolved in 5 ml. of alcohol and one equivalent of 0.1 N hydrochloric acid added. The mixture was concentrated in vacuo. The residue was covered with 5 ml. of ether and crystallized upon cooling and scratching. Recrystallization from ethanol afforded the subject compound having M.P. 158–160°.

EXAMPLE 12

*9-methoxy-11-amino-1,2,3,11,12,12a-hexahydro-(4H,6H)-pyrido[1,2-c][1,4]benzodiazepine*

1.9 g. of Zn-dust was suspended in 8 ml. of water. 1.8 g. of 9-methoxy - 11 - nitroso - 1,2,3,11,12,12a-hexahydro (4H,6H)pyrido]1,2-c][1,4]benzodiazepine was dissolved in 5 ml. of acetic acid and 5 ml. of water. The mixture was added dropwise at 10° to the suspension of Zn-dust in water. The reaction mixture was stirred at room temperature for an additional hour and warmed on the steam bath for 5 minutes. The mixture was filtered and the Zn-dust washed with water. The filtrate was cooled and alkalized with 3 N sodium hydroxide and extracted with chloroform. The chloroform solution was dried over sodium sulfate, filtered and concentrated in vacuo. The residue crystallized upon trituration with petroleum/ether. After recrystallization from petroleum/ether, the material melted at 98°. Yield: 1.1 g.

Analysis.—Calculated for $C_{14}H_{21}N_3O$ (MW 247.33): C, 68.00%; H, 8.32%; N, 16.98%. Found: C, 68.17%; H, 8.51%; N, 16.76%.

EXAMPLE 13

*8-chloro-11-amino-1,2,3,11,12,12a-hexahydro(4H,6H)-pyrido[1,2-c][1,4]benzodiazepine*

7.6 g. of Zn-dust was suspended in 30 ml. of water. 5.3 g. of 8-chloro-11-nitroso-1,2,3,11,12,12a-hexahydro(4H,6H)pyrido[1,2-c][1,4]benzodiazepine was dissolved in a solution of 40 ml. of 50% acetic acid. The mixture was added dropwise at room temperature, sitrred at the same temperature for an additional one and a half hours and warmed on the steam bath for 5 minutes. The mixture was then filtered and the Zn-dust was washed with water. The filtrate was cooled and alkalized with 3 N sodium hydroxide and extracted with chloroform. The chloroform solution was dried over sodium sulfate, filtered and concentrated in vacuo. The residue crystallized upon trituration with petroleum/ether. After recrystallization from pentane, the material melted at 115–116°. Yield: 3.5 g.

*Analysis.*—Calculated for $C_{13}H_{18}ClN_3$ (MW 251.75): C, 62.00%; H, 7.20%; N, 16.69%. Found: C, 62.04%; H, 7.37%; N, 16.43%.

EXAMPLE 14

*8-chloro-11-amino-1,2,3,11,12,12a-hexahydro(4H,6H)-pyrido[1,2-c][1,4]benzodiazepine monohydrochloride*

50 mg. of 8-chloro-11-amino-1,2,3,11,12,12a-hexahydro(4H,6H)pyrido[1,2-c][1,4]benzodiazepine was dissolved in 3 ml. of ethanol and one equivalent of 0.1 N hydrochloric acid added. The mixture was concentrated in vacuo. The residue crystallized upon addition of ether.

EXAMPLE 15

*8-bromo-11-nitroso-1,2,3,11,12,12a-hexahydro(4H,6H)-pyrido[1,2-c][1,4]benzodiazepine*

3.6 g. of 8-bromo-1,2,3,11,12,12a-hexahydro(4H,6H)pyrido[1,2-c][1,4]benzodiazepine, made according to procedures analogous to those described in Example 1 and having a M.P. of 103–104°, was dissolved in a mixture of 3 ml. concentrated hydrochloric acid 8 ml. of water. The mixture was stirred and cooled to 10°. A solution of 1.4 g. of sodium nitrite in 5 ml. of water was added dropwise over a period of 10 minutes. The resulting mixture was stirred at 10° for an additional one and a half hours. The mixture was then alkalized with an excess of a solution of sodium carbonate and extracted with chloroform. The combined chloroform extracts were dried over sodium sulfate, filtered, and the solvent removed in vacuo. The residue crystallized upon cooling. The material melted at 96–97° after recrystallization from petroleum ether. Yield: 1.3 g.

*Analysis.*—Calculated for $C_{13}H_{18}BrN_3O$ (MW 310.19): C, 50.36%; H, 5.20%; N, 13.54%. Found: C, 50.72%; H, 5.45%; N, 13.63%.

EXAMPLE 16

*9-trifluoromethyl-11-nitroso-1,2,3,11,12,12a-hexahydro-(4H,6H)pyrido[1,2-c][1,4]benzodiazepine*

0.9 g. of 9-trifluoromethyl-1,2,3,11,12,12a-hexahydro-(4H,6H)pyrido[1,2-c][1,4]benzodiazepine, M.P. 105–106° and prepared in accordance with procedures analogous to those described in Example 1, was dissolved in a mixture of 1.5 ml. of concentrated hydrochloric acid and 4 ml. of water. The mixture was stirred and cooled to 10°. A solution of 0.3 g. of sodium nitrite in 2 ml. of water was added dropwise during a period of 5 minutes. The reaction mixture was stirred at 10° for an additional one hour. The mixture was alkalized to pH 8–9 with a solution of sodium carbonate and extracted with chloroform. The combined chloroform extracts were dried over sodium sulfate, filtered, and the solvent removed in vacuo. The residue was triturated with pentane and cooled, whereupon crystallization occurred. Recrystallization from ether gave material of M.P. 92–93°. Yield: 0.5 g.

EXAMPLE 17

*8,9-methylenedioxy-11-nitroso-1,2,3,11,12,12a-hexahydro-(4H,6H)pyrido[1,2-c][1,4]benzodiazepine*

2.3 g. of 8,9-methylenedioxy-1,2,3,11,12,12a-hexahydro-(4H,6H)pyrido[1,2-c][1,4]benzodiazepine, made in accordance with the procedures analogous to those described in Example 1 and having a M.P. of 285–296°, was dissolved in a mixture of 4 ml. of concentrated hydrochloric acid and 8 ml. of water. The mixture was cooled to 10° with stirring and a solution of 1.4 g. of sodium nitrite in 5 ml. of water was added dropwise during a period of 10 minutes. The reaction mixture was stirred at the same temperature for an additional one and a half hours. The mixture was alkalized by adding an excess of a solution of sodium carbonate and then extracted with chloroform. The chloroform extracts were combined and dried over sodium sulfate and filtered. The solvent was removed in vacuo. The residue crystallized upon cooling; after recrystallization from hexane the material melted at 52–53°. Yield: 1.3 g.

*Analysis.*—Calcd. for $C_{14}H_{17}N_3O_3$ (MW 275.29): C, 61.07%; H, 6.26%; N, 15.25%. Found: C, 60.99%; H, 6.62%; N, 15.24%.

EXAMPLE 18

*8,9-methylenedioxy-11-amino-1,2,3,11,12,12a-hexahydro-(4H,6H)pyrido[1,2-c][1,4]benzodiazepine*

1.6 g. of Zn-dust was suspended in 10 ml. of water and 1.2 g. of 8,9-methylenedioxy-11-nitroso - 1,2,3,11,12,12a-hexahydro(4H,6H)pyrido[1,2-c][1,4]benzodiazepine, dissolved in 10 ml. 50% acetic acid was added dropwise at 10° to the suspension of Zn-dust in water. The reaction mixture was stirred at room temperature for an additional one hour and then warmed on the steam bath for 5 minutes. The mixture was filtered hot and the Zn-dust washed with hot water. The filtrate was cooled and alkalized with 3 N sodium hydroxide to a pH of 11–12 and then extracted with chloroform. The chloroform extracts were combined and dried over sodium sulfate, filtered, and the solvent removed in vacuo. The residue crystallized upon cooling. Recrystallization from ether yielded the desired substance having a M.P. 91–92°. Yield: 0.7 g.

While the invention has been illustrated by a detailed description of certain specific embodiments, it is understood that various modifications and substitutions can be made in any of them within the scope of the appended claims which are also intended to include equivalents of such embodiments.

What is claimed is:

1. A pyridobenzodiazepine derivative of the formula

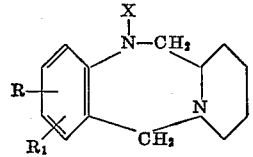

wherein R and $R_1$ are hydrogen, halogen, trifluoromethyl, lower alkyl, lower alkoxy or methylenedioxy, and X is nitroso or amino or the pharmaceutically acceptable acid addition salts thereof.

2. 8-chloro-11-nitroso-1,2,3,11,12,12a - hexahydro(4H,6H)pyrido[1,2-c][1,4]benzodiazepine.

3. 8-chloro-11-amino-1,2,3,11,12,12a - hexahydro(4H,6H)pyrido[1,2-c][1,4]benzodiazepine.

4. 9-chloro-11-nitroso-1,2,3,11,12,12a - hexahydro(4H,6H)pyrido[1,2-c][1,4]benzodiazepine.

5. 8,9-dimethoxy-11-nitroso-1,2,3,11,12,12a - hexahydro(4H,6H)pyrido[1,2-c][1,4]benzodiazepine.

6. 8-methyl-11-nitroso-1,2,3,11,12,12a - hexahydro(4H,6H)pyrido[1,2-c][1,4]benzodiazepine.

7. 8-methyl-11-amino-1,2,3,11,12,12a - hexahydro(4H,6H)pyrido[1,2-c][1,4]benzodiazepine.

8. 9-methoxy-11-nitroso-1,2,3,11,12,12a-hexahydro(4H,6H)pyrido[1,2-c][1,4]benzodiazepine.

9. 9-methoxy-11-amino-1,2,3,11,12,12a - hexahydro(4H,6H)pyrido[1,2-c][1,4]benzodiazepine.

10. 8,9-dimethyl-11-nitroso - 1,2,3,11,12,12a - hexahydro(4H,6H)pyrido[1,2-c][1,4]benzodiazepine.

11. 8,9-methylenedioxy-11-nitroso-1,2,3,11,12,12a-hexahydro(4H,6H)pyrido[1,2-c][1,4]benzodiazepine.

12. 8,9-methylenedioxy-11-amino-1,2,3,11,12,12a-hexahydro(4H,6H)pyrido[1,2-c][1,4]benzodiazepine.

13. 8-bromo-11-nitroso-1,2,3,11,12,12a-hexahydro(4H,6H)pyrido[1,2-c][1,4]benzodiazepine.

14. 9-trifluoromethyl-11-nitroso-1,2,3,11,12,12a - hexahydro(4H,6H)pyrido[1,2-c][1,4]benzodiazepine.

15. 8-methyl-11-nitroso-1,2,3,11,12,12a-hexahydro(4H,6H)pyrido[1,2-c][1,4]benzodiazepine hydrochloride.

16. 8-methyl-11-nitroso-1,2,3,11,12,12a-hexahydro(4H,6H)pyrido[1,2-c][1,4]benzodiazepine sulfate.

17. 8,9-dimethoxy-11-nitroso-1,2,3,11,12,12a - hexahydro(4H,6H)pyrido[1,2-c][1,4]benzodiazepine hydrochloride.

18. 8-chloro-11-nitroso-1,2,3,11,12,12a - hexahydro(4H,6H)pyrido[1,2-c][1,4]benzodiazepine hydrochloride.

19. 8-chloro-11-amino-1,2,3,11,12,12a - hexahydro(4H,6H)pyrido[1,2 - c][1,4]benzodiazepine monohydrochloride.

20. 8-methyl-11-amino-1,2,3,11,12,12a - hexahydro(4H,6H)pyrido[1,2 - c][1,4]benzodiazepine monohydrochloride.

No references cited.

WALTER A. MODANCE, *Primary Examiner.*

AVROM D. SPEVACK, *Assistant Examiner.*

UNITED STATES PATENT OFFICE
CERTIFICATE OF CORRECTION

Patent No. 3,336,320                      August 15, 1967

Karl Johann Doebel et al.

It is hereby certified that error appears in the above numbered patent requiring correction and that the said Letters Patent should read as corrected below.

Column 2, line 8, for "reached" read -- reacted --; column 5, line 30, for "4. g. of ethyl" read -- 4.5 g. of ethyl --; column 7, line 3, for "N-(methyl-2-nitrobenzoyl)" read -- N-(5-methyl-2-nitrobenzoyl) --.

Signed and sealed this 19th day of November 1968.

(SEAL)
Attest:

Edward M. Fletcher, Jr.                      EDWARD J. BRENNER
Attesting Officer                            Commissioner of Patents